United States Patent [19]

Roland

[11] Patent Number: 5,228,857
[45] Date of Patent: Jul. 20, 1993

[54] BRICK DISPLAY BOARD

[76] Inventor: Rick Roland, 184 Old Stage Rd., Jackson, Tenn. 38305

[21] Appl. No.: 880,584

[22] Filed: May 8, 1992

[51] Int. Cl.⁵ .......................................... G09B 25/04
[52] U.S. Cl. ...................................... 434/74; 52/314; 52/DIG. 13
[58] Field of Search ................. 40/489, 490, 611, 620; 434/74, 75, 76, 77, 78, 79, 80, 367, 370, 430; 52/DIG. 13, 27, 314

[56] References Cited

U.S. PATENT DOCUMENTS

| | | | |
|---|---|---|---|
| 1,478,425 | 12/1923 | Dickinson | 434/74 |
| 2,259,435 | 10/1941 | Collins | 434/74 |
| 2,581,762 | 1/1952 | Hesse | 40/611 |
| 3,316,669 | 5/1967 | Nachbar | 40/620 |
| 3,659,358 | 5/1972 | Brown | 434/74 |
| 4,457,718 | 7/1984 | Lerner | 434/367 |
| 4,744,189 | 5/1988 | Wilson | 434/430 |
| 4,884,352 | 12/1989 | Lipscomb | 40/489 |
| 5,011,446 | 4/1991 | Feinberg | 40/611 |

*Primary Examiner*—Carl D. Friedman
*Assistant Examiner*—Christopher Kent
*Attorney, Agent, or Firm*—Thompson & Knight

[57] ABSTRACT

An apparatus is disclosed for displaying masonry brick. The apparatus is constructed of a single sheet of clear, transparent plexiglass to which display bricks are securely mounted. Display bricks of various colors, styles and/or textures are removably affixed to the plexiglass sheet through the use of VELCRO ® fastening strips or other similar fastening means. Alternatively, the display bricks can be permanently attached to the plexiglass sheet through the use of an appropriate adhesive material. The plexiglass sheet is folded back so as to provide elongated channels along two opposing sides thereof configured to selectively receive individual sheets of colored paper or cardboard to simulate various mortar colors. One or more cards with various preprinted patterns can also be used as a guide for precisely aligning the display bricks on the plexiglass sheet in particular masonry patterns. The brick display board is also configured to selectively receive trim samples to simulate various brick/mortar/trim color combinations. The brick display board may also include spaces dedicated to advertising information, illustrations and/or photographs.

5 Claims, 2 Drawing Sheets

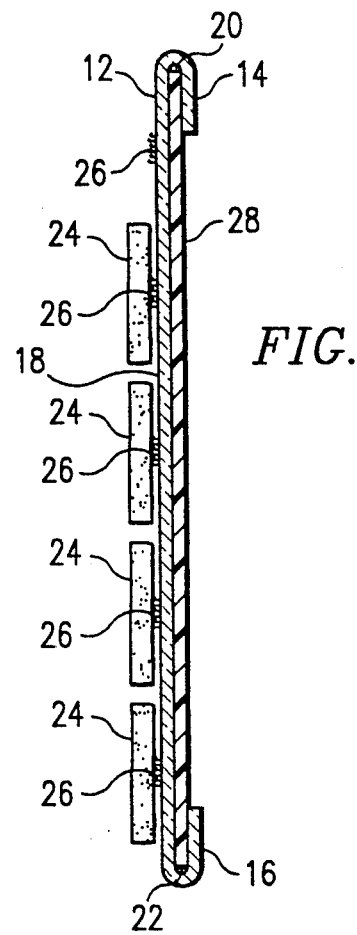
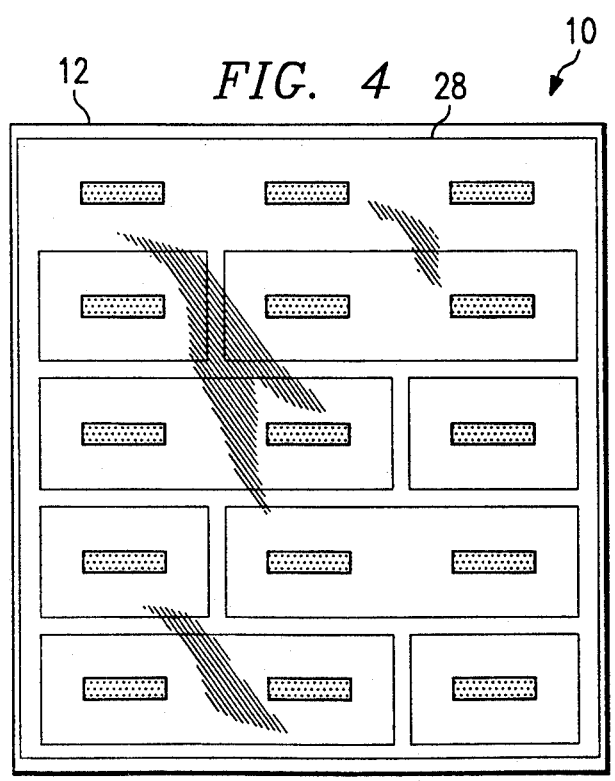

BRICK DISPLAY BOARD

BACKGROUND OF THE INVENTION

1. Field of the Invention

This invention relates to an apparatus for displaying masonry brick for residential and commercial building applications. More particularly, the invention relates to an improved brick display board for selectively displaying a variety of colors and styles of masonry brick with a variety of colors of mortar and/or trim.

2. Description of the Prior Art

A variety of brick display boards are disclosed in the prior art. For example, U.S. Pat. No. 1,478,425 discloses a brick display device whereby display bricks are mounted to a transparent surface with a means for inserting colored cards behind the bricks to simulate different mortar colors. Another similar device is disclosed in U.S. Pat. No. 3,659,358, which provides a brick display board with a plurality recesses configured to interchangeably receive display bricks of a variety of colors and textures. The latter reference also provides for interchangeable trim pieces of various colors to be added to simulate various brick/trim color combinations.

The devices disclosed in the prior art, however, suffer from the fact that they are all relatively complicated and expensive to construct and are relatively heavy and bulky.

What is needed is an improved brick display board that is simple and inexpensive to produce, lightweight and easy to transport, and easy to use. Such a device is disclosed and claimed herein.

SUMMARY OF THE INVENTION

An apparatus is disclosed for displaying masonry brick. The apparatus is constructed of a single sheet of clear, transparent plexiglass to which display bricks are securely mounted. Display bricks of various colors, styles and/or textures are removably affixed to the plexiglass sheet through the use of VELCRO ® fastening strips or other similar fastening means. Alternatively, the display bricks can be permanently attached to the plexiglass sheet through the use of an appropriate adhesive material. The plexiglass sheet is folded back so as to provide elongated channels along two opposing sides thereof configured to selectively receive individual sheets of colored paper or cardboard to simulate various mortar colors. One or more cards with various preprinted patterns can also be used as a guide for precisely aligning the display bricks on the plexiglass sheet in particular masonry patterns. The brick display board is also configured to selectively receive trim samples to simulate various brick/mortar/trim color combinations. The brick display board may also include spaces dedicated to advertising information, illustrations and/or photographs.

It is, therefore, an object of the present invention to provide an improved brick display board designed to selectively simulate various color combinations of brick, mortar and/or trim.

Another object of the present invention is to provide an improved brick display board designed to selectively simulate various color combinations of brick, mortar and trim, that is simple and inexpensive to manufacture.

It is a further object of the present invention to provide an improved brick display board designed to selectively simulate various color combinations of brick, mortar and trim, that is lightweight and easy to transport.

Yet another object of the present invention is to provide an improved brick display board designed to selectively simulate various color combinations of brick, mortar and trim, that is easy to use in terms of the interchangeability of display bricks, colored cards used to simulate a variety of mortar colors, and trim samples used to simulate a variety of trim colors.

A still further object of the invention is to provide an improved brick display board that is weather resistant.

The above objects and other features of the present invention will become fully apparent from the following detailed description of the preferred embodiment in conjunction with the drawing.

BRIEF DESCRIPTION OF THE DRAWING

FIG. 3 is a cross section view of the present invention, taken along cutting plane line 3—3 of FIG. 2.

FIG. 4 is an orthoganal front view of the present invention with placement template in place.

DESCRIPTION OF THE PREFERRED EMBODIMENT

Figure 1:
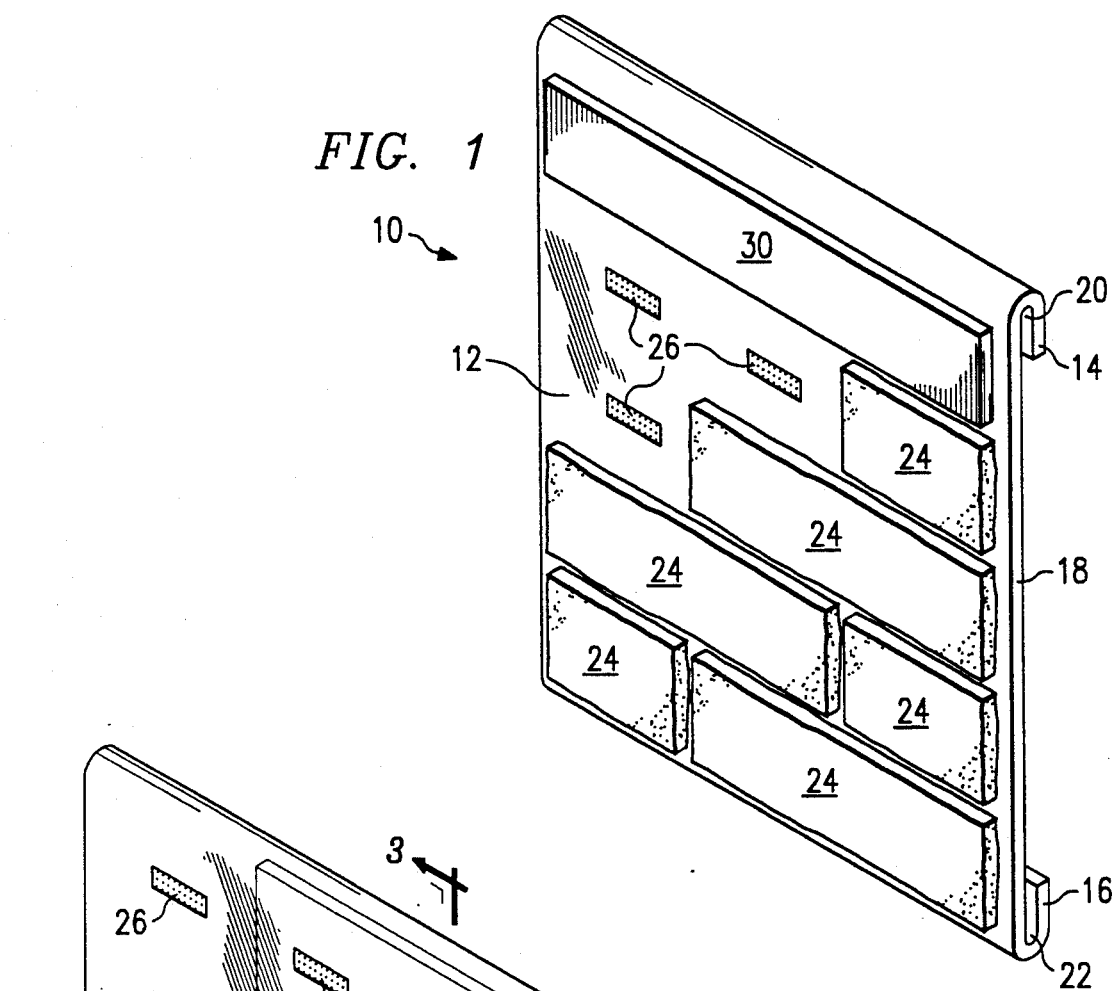
FIG. 1 is a perspective view of the present invention.
Figure 2:
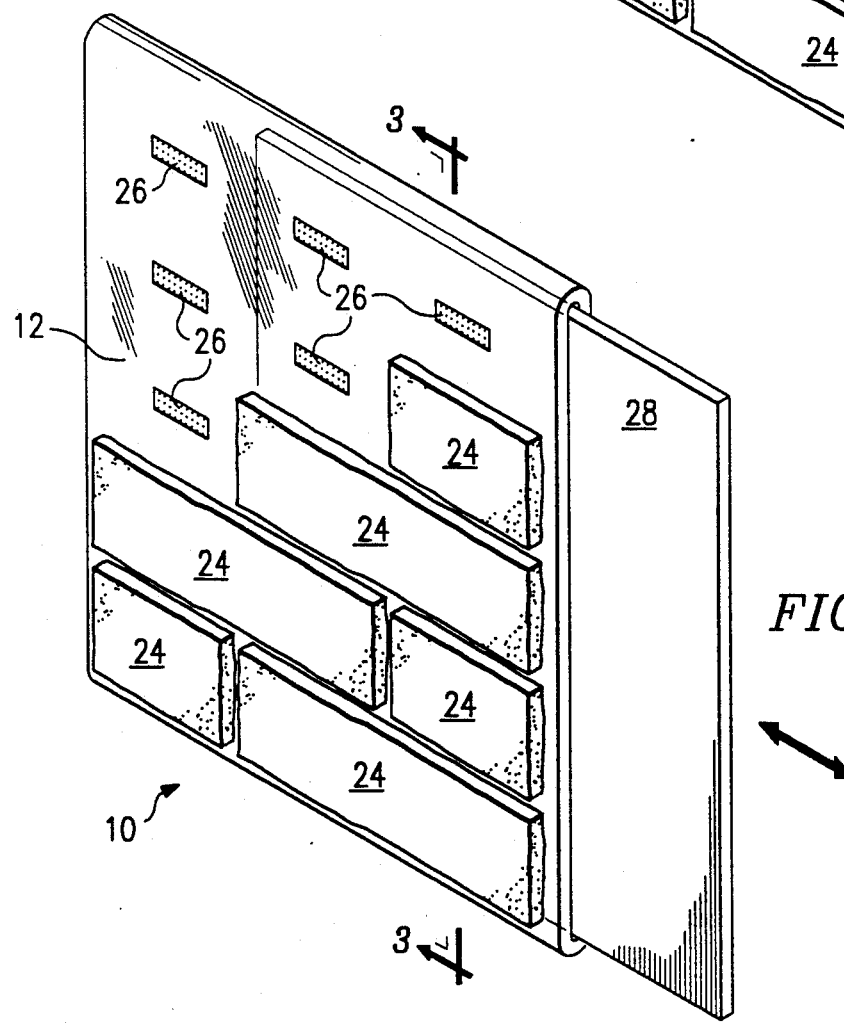
FIG. 2 is a second perspective view of the present invention showing a colored card being inserted into the back of the display board.

Reference is now made to the drawing, wherein like parts are designated with like numerals throughout. In the preferred embodiment, display board 10 is formed from a single sheet of clear, transparent plexiglass 12. The overall measurements of sheet 12 are approximately 16 inches tall and 13 inches wide. Approximately one and one-half inches of the top and bottom of sheet 12 are folded back to form top portion 14 and bottom portion 16. The folding of top and bottom portions 14 and 16 can be accomplished through a number of conventional methods that are well known to those skilled in the art. With top and bottom portions 14 and 16 folded back, the front or center portion 18 of display board 10 measures approximately 13 inches by 13 inches. The distance between the back surface of center portion 18 and the front surface of top and bottom portions 14 and 16 is approximately one-eighth of an inch, thereby creating elongated channels 20 and 22 that measure approximately one and one-half inches tall, 13 inches long, and one-eighth of an inch thick.

Display board 10 is adapted to display a plurality of display bricks 24. Display bricks 26 are made out of conventional masonry bricks. The length and height of display bricks 26 are the same as conventional bricks (approximately seven and one-half inches long and two and one-quarter inches high), but display bricks 24 are only approximately one-half inch thick to reduce the weight of each individual brick as well as the weight of the assembled display fixture. The dimensions of center portion 18 permits four courses of display bricks 24 to be displayed on display board 10 at the same time and still leave a space of approximately two and one-half inches at the top to be used in the manner discussed below.

Display bricks 24 may be mounted on the surface of center portion 18 using a variety of well known and conventional methods. In the preferred embodiment, a plurality of display bricks 24 are secured to the display board 10 through the use of VELCRO ® fastening strips, thereby permitting the use of a single display board with a variety of display bricks. Alternatively, display bricks 24 may be permanently affixed to display board 10 through the use of a suitable adhesive or may be secured to display board 10 through a number of other conventional means well known in the art. Whatever method of affixation is used, display bricks 24 are arranged with spaces between them, preferably in a conventional masonry pattern, to simulate the manner in which they will actually appear in the finished structure.

The use of VELCRO ® fastening strips 26 or other fasteners that allow selective removal of display bricks 24 adds flexibility to display board 10. For example, the use of removable display bricks 24 permits different colors, styles and textures of display bricks 24 to be mixed and matched on the same display board 10 for comparison. Further still, removable display bricks 24 permits one or more display bricks 24 to be selectively removed and replaced with advertising materials, illustrations and/or photographs to further enhance the flexibility of display board 10.

Elongated channels 20 and 22 are adapted to receive one or more cards, such as card 28. With a plurality of display bricks 24 in place, the front surface of card 28 is visible through the spaces separating display bricks 24 and through transparent center portion 18 to simulate a particular mortar color. By interchanging a plurality of individual cards of various colors, a salesman can selectively simulate different brick/mortar color combinations for prospective customers. As shown in FIG. 3, card 28 can also include a pre-printed template to be used in precisely aligning display bricks 24 on display board 10 in the proper spacing and arrangement. When card is inserted into the back of display board 10 so that the template is visible through center portion 18, the pre-printed template on card 28 aids in the precise alignment of display bricks 24 in the desired arrangement.

As shown in FIG. 1, display board 10 may also be used to display wood or plastic trim samples 30 of various colors. As with display bricks 24, trim samples 30 may be selectively affixed to display board 10 through the use of VELCRO ® fastening strips 26 or other conventional means. Through the use of trim samples 30 of various colors, in combination with display bricks 24 and cards 28, display board 10 can be used to simulate a variety of brick/mortar/trim color combinations to assist the potential customer to visualize a particular color combination in a finished structure without ever leaving the showroom. Although not shown in the drawing, roof shingles of various colors and styles could also be selectively affixed to display board 10 to simulate the overall appearance and brick, mortar, trim and shingle color combinations.

In view of the foregoing description, the advantages of the present invention over the prior art in terms of the ease and cost to manufacture should be readily apparent. Further advantages over the prior art also include the present invention's flexibility, ease of use, durability and weather resistant construction.

The invention may be embodied in other specific forms without departing from its spirit or essential characteristics. The described embodiment is to be considered in all respects only as illustrative and not restrictive, and the scope of the invention is, therefore, indicated by the appended claims rather than the foregoing description. All changes that come within the meaning and range of equivalency of the claims are embraced within their scope.

I claim:
1. An improved brick display apparatus comprising:
    a single sheet of clear, transparent plexiglass having a top portion and a bottom portion, said top and bottom portions being folded back to form a pair of elongated channels;
    a plurality of display bricks;
    means for selectively and securely affixing said plurality of display bricks to said plexiglass sheet in a pre-selected, spaced apart pattern; and
    a plurality of colored cards configured to be selectively inserted behind said plexiglass sheet and supported by said pair of elongated channels.

2. The improved brick display apparatus set forth in claim 1 wherein said plexiglass sheet measures approximately 16 inches by 13 inches.

3. The improved brick display apparatus set forth in claim 1 wherein said display brick comprises masonry brick having a length and height equal to conventional residential masonry brick, and a thickness of approximately one-half inch.

4. The improved brick display apparatus set forth in claim 1 wherein said affixing means comprises hook and loop fastening strips.

5. The improved brick display apparatus set forth in claim 1 further comprising trim samples of one or more colors and means for selectively affixing said trim samples to said display apparatus.

* * * * *